CARL CONNALLY JR
ELLIOTT B. ELFRINK
LORLD G. SHARP     *INVENTORS.*

ATTORNEY

United States Patent Office 3,253,652
Patented May 31, 1966

3,253,652
RECOVERY METHOD FOR PETROLEUM OIL
Carl Connally, Jr., and Elliott B. Elfrink, Dallas, and Lorld G. Sharp, Irving, Tex., assignors to Socony Mobil Oil Company, Inc., a corporation of New York
Filed June 24, 1963, Ser. No. 289,867
5 Claims. (Cl. 166—2)

This invention relates to the recovery of liquid material from a subterranean formation. More specifically, this invention relates to the application of known recovery techniques in a given sequence to a particular geometric pattern of wells leading to a subterranean formation.

Liquid material, such as petroleum oil, is usually recovered initially from most subterranean formations by taking advantage of inherent formation pressure, such as gas pressure or natural water drive, which forces the oil from the petroleum-bearing formation or reservoir through a producing well to the surface of the earth. As the recovery of petroleum oil from a formation progresses, the native energy gradually decreases and finally becomes insufficient to force the oil to the earth's surface. This usually occurs at a time when a major portion of the oil remains within the reservoir. Improved recovery methods may be employed to recover more oil from those reservoirs prior to permitting the pressure to decline or to recover additional oil after the reservoir pressure has begun to decline. Various improved recovery methods involve displacement of oil within a formation to a production well or wells by injection of a displacing fluid, either a gas or liquid, into the formation through an injection well or wells.

In recovery methods employing displacing fluids, the displacing fluids travel from the area of injection to the area of production along pathways determined, to some extent, by the number and relative positions of the injection and production wells. The oil within the pathways of travel of the displacing fluid in the formation will be the oil susceptible of recovery by the procedure employed. The remainder of the oil lying outside of the pathways of travel of the displacing fluid will not be recoverable by that particular procedure. The shape of the area of the formation within the pathways of travel of the displacing fluid is termed the "sweep pattern," and the ratio of the area within the sweep pattern to the total area is called the "sweep efficiency." Economics of operation requires a maximum sweep efficiency commensurate with the number of injection and production wells. Conventionally, the injection and production wells are arranged in regular, uniform patterns with an injection well surrounded by a plurality of production wells. While moderately efficient areal sweeps are sometimes obtained with these well patterns, still higher efficiencies are desirable.

It is one object of the present invention to provide a new and novel method of recovering petroleum oil from a subterranean formation. It is another object of the invention to recover petroleum oil by applying principles of known recovery techniques in a new, novel manner to a particular geometric pattern of well positions.

In accordance with the invention, liquid material is recovered through a plurality of wells arranged in substantially parallel rows by establishing a continuous displacing flood along an internal row of wells and driving the flood front along a substantially uniform line to the outside or boundary rows of wells. The flood is established along the inner row of wells by first initiating displacing floods around alternate wells in the internal row while producing from the remaining wells in the row; and when the floods around the alternate wells become detectable in the remaining wells, the alternate wells are shut in and the remaining wells are converted to injection wells. Floods are then initiated around the remaining wells and displaced into the formation to merge with the floods around the alternate wells until a substantially uniform, continuous flood front is formed around all of the wells in the internal row. At this time all of the wells in the internal row are established as injection wells and the continuous, uniform flood front along the line of the internal row is displaced to the outside rows of wells in the geometric pattern with liquid material production occurring in the wells other than those in the internal row as the flood progresses through the pattern.

The process of the invention is applicable to any type of secondary recovery form of oil production or other form of liquid recovery from an earth formation where a flood is established around an injection well and driven through a reservoir toward a production well for the purpose of displacing the oil from the reservoir to the production well. Among the processes to which the invention is applicable are water drive using a water flood, miscible flooding using a miscible slug, and in-situ combustion using a fire flood. In a water drive process, water is injected into a formation through an injection well; and the injected water displaces oil from the formation and drives it through the formation to a production well. In miscible flooding, a fluid material is injected into the formation through an injection well to form a miscible fluid phase in the formation and thereafter a driving fluid is injected into the formation. The fluid material injected into the formation is one which is miscible with the oil in the formation, and the driving fluid is one which is miscible wth the material forming the miscible fluid phase. The driving fluid forces the miscible fluid phase through the formation into the direction of the production well or wells, and the advancing miscible fluid phase displaces the oil from the formation and drives it in the direction of the production wells. In in-situ combustion, a combustion-supporting gas is injected into the formation through an injection well and combustion of oil within the formation is initiated. With continued injection of the combustion-supporting gas, a flame front or fire flood advances through the formation, consuming a portion of the petroleum oil in the formation and displacing the remainder from the formation and forcing it in the direction of the production well or wells. Various combinations of these procedures may be employed. For example, a gas and water may be employed as the displacing fluid. Water may be used in connection with a miscible flooding procedure. Water may also be employed in conjunction with an in-situ combustion operation.

In the drawings:
FIGURE 1 is a diagrammatic representation of a geometrical pattern of wells to which the process of the invention may be applied, illustrating the position of a flood pattern in the early stages of the process.

Figure 1:
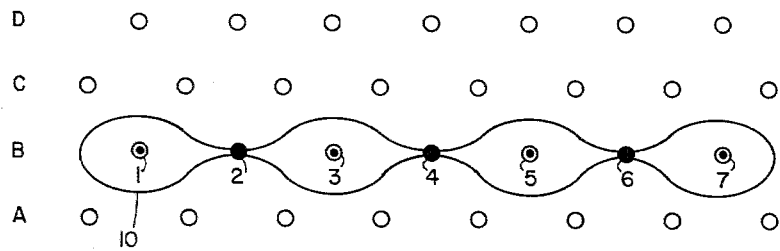
Figure 2:
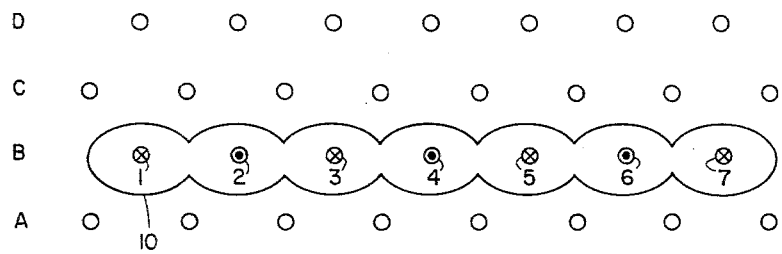
FIGURE 2 is a diagrammatic illustration similar to FIGURE 1 showing the flood pattern and the state of certain wells at an intermediate stage in the process of the invention.
Figure 3:
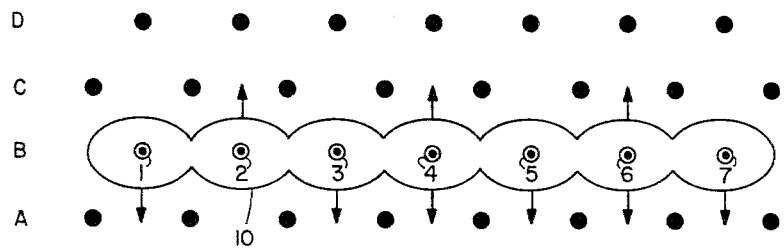
FIGURE 3 is a diagrammatic illustration similar to FIGURE 1 illustrating the process of the invention at a still later stage.

Referring to FIGURE 1 of the drawings, a plurality of wells are arranged in substantially parallel rows, A, B, C, and D. The wells may be arranged in vertical alignment as well as horizontal alignment, though it is preferred that the wells in adjacent rows, such as rows C and D, be offset from each other as illustrated in the drawings. Those wells in rows A, C, and D in both FIGURES 1 and 2 are represented by open circles inasmuch as at the particular stages of the process of the invention illustrated by these figures these particular wells have not yet become active in the process. In FIGURES 1, 2, and 3, the wells represented by a circle with a dot in the center are injection wells; those which are solid circles are production wells; while those which are circles having a superimposed X mark are shut-in wells. While four horizontal rows of wells are illustrated in the drawings, it is to be understood that the invention is not limited to any particular number of rows of wells.

The process of the invention is carried out in the following manner. Referring to FIGURE 1 of the drawings, the procedure begins with an internal row of wells, such as row B. For simplicity in describing the process, the wells in row B have been given the numbers 1 through 7, respectively. First, alternate wells (wells 1, 3, 5, and 7) are established as injection wells while the remaining wells (wells 2, 4, and 6) are prepared as production wells. Liquid material displacing floods are then developed in the reservoir around wells 1, 3, 5, and 7. Where a miscible flood is to be carried out, this step is effected by injecting into wells 1, 3, 5, and 7 a fluid which is miscible with the liquid material in the reservoir. In the case of a water drive, the desired floods are established around wells 1, 3, 5, and 7 by injecting water into such wells. Where in-situ combustion is to be employed, the formation around wells 1, 3, 5, and 7 is ignited in the conventional manner to establish a fire flood around each of such wells. The particular floods desired, once established around the wells, are driven into the formation to establish the flood patterns illustrated by lines 10 around the wells in row B of FIGURE 1.

During the step of driving the floods from the alternate wells through the reservoir, the remaining wells (wells 2, 4, and 6) are allowed to produce. During this same step, the wells in rows A, C, and D are maintained in a state ranging from normal production to complete shut-in, depending upon the reservoir conditions and the particular type flood being propagated. In the case of a miscible flood, the wells in rows A, C, and D are maintained in either a shut-in condition or very limited production in order to encourage the movement of the floods toward wells 2, 4, and 6. This same condition of the wells in rows A, C, and D will apply in connection with the in-situ combustion process, while in the instance of a water drive these wells may be allowed to produce normally since the economics of a water drive is such that there is no need for concern about excessive uses of water or the width of the flood band formed in the reservoir. Economics, of course, does enter into the situation where a miscible flood is being employed due to the cost of the miscible materials, which is appreciably above that of water.

The driving of the floods outwardly from wells 1, 3, 5, and 7 is continued until the floods are sensed in wells 2, 4, and 6, at which time wells 2, 4, and 6 are converted to injection wells and wells 1, 3, 5, and 7 are shut in. The sensing of the floods at wells 2, 4, and 6 in this step depends upon the particular type of flood involved. For example, where the flood is either of miscible material or water, the sensing of the flood comprises a determination of the actual breakthrough of the flood material into the wells. In the instance of an in-situ combustion process, wells 2, 4, and 6 will be shut in when they begin to approach a temperature which may damage the equipment in the wells. Of course, it is obvious that prior to the shutting in of wells 1, 3, 5, and 7, fluid injection into them, whether it be L.P.G., water, or combustion-supporting fluids in the case of in-situ combustion, is terminated.

With wells 2, 4, and 6 now converted to injection wells and wells 1, 3, 5, and 7 shut in, displacing floods are established around wells 2, 4, and 6 and the floods are driven outwardly from the wells by means of the fluids being injected into the wells. In the instance of the miscible type flood, the fluid being injected into wells 2, 4, and 6 will be a fluid which is miscible with the liquid material to be recovered. In the case of an in-situ combustion process, the injected fluid will be a combustion-supporting gas, such as oxygen or air. The driving of the floods outwardly from wells 2, 4, and 6 by fluid injection is continued until a sufficient quantity of driving fluid has been introduced to provide a substantially uniform flood front along both sides of the wells in row B, as illustrated in FIGURE 2 by line 10 which at this stage has moved toward rows D and A. At this time, of course, the floods moving outwardly from wells 2, 4, and 6 will have completely merged with the floods previously established around wells 1, 3, 5, and 7 so that the merged floods form one continuous flood having a front which completely envelops the line of wells in row B.

During injection of fluid into wells 2, 4, and 6, those wells in rows A, C, and D are, in the case of a miscible flood or in-situ combustion, maintained in either a shut-in or limited-production status which will tend to force the distribution of the floods moving outwardly from wells 2, 4, and 6 toward wells 1, 3, 5, and 7. If there is breakthrough into any of the wells in rows A, C, or D, that particular well is then shut in. In the case of a water flood, while injection is occurring into wells 2, 4, and 6, the wells in rows A, C, and D may be produced in a normal manner because there is no need for concern over the quantity of water being injected or the quantity of water comprising the flood within the reservoir. Of course, should there be an extraordinarily large ratio of water-to-oil in any one of these wells in rows A, C, and D and the pressure pattern within the flood was being affected by this loss of water, the wells should be either shut in or production from them limited.

When the above-discussed continuous flood encompassing all the wells in row B is established, as illustrated in FIGURE 2, wells 1, 3, 5, and 7 are reactivated as injection wells, as shown in FIGURE 3. Fluid injection is continued through wells 2, 4, and 6 and is reinitiated through wells 1, 3, 5, and 7. At this stage, fluid injection will be occurring into all of the wells in row B. If the process is miscible displacement, the fluid being injected may be one which is miscible with the reservoir liquid material, such as L.P.G. or butane, or it may be a driving fluid, such as air or methane, depending upon whether or not sufficient miscible material has already been introduced into the reservoir. A sufficient quantity of miscible material is introduced into the reservoir through the wells in row B to establish a miscible fluid bank which will not completely dissipate until the entire reservoir has been swept by the flood. This quantity is determined by known reservoir engineering techniques. When the needed amount of miscible material has been introduced through the wells in row B, then the fluid being injected into all of the wells in row B will be a driving fluid. The fluid being injected in the case of a water flood, of course, is water, while that in in-situ combustion process will be a combustion-supporting gas, such as air or oxygen.

With fluid injection established into all of the wells in row B, the continuous flood established around the wells in this row is driven outwardly in portions along substantially uniform fronts about parallel to rows A, C, and D toward the well in rows A, C, and D and any other rows parallel to these rows which may exist in the well pattern of the reservoir. Referring to FIGURE 3, the flood fronts are driven in the direction of the arrows. At the time that fluid injection is initiated into all of the wells in row B, all of the wells in rows A, C, and D are established as production wells with the wells being open to the widest extent permitted by local regulations or prudent reservoir engineering practices. Fluid injection into the wells in row B, with the consequent driving of the flood fronts toward the boundary rows of wells, is continued with production of reservoir liquid being obtained through the wells in rows A, C, and D. During this step, the boundary wells, that is, those which are in rows A and D, are continuously produced at the highest allowable rate until the ratio of driving fluid-to-displaced fluid, that is, the ratio of the fluids employed in displacing the liquid material to the liquid material being produced, ceases to be economical. It will be obvious from examining FIGURE 3 and the paths traversed by the flood fronts propagated from the wells in row B that substantial liquid material production will be obtained from the wells in the rows between row B and the boundary rows, for example, as illustrated, those wells in row C. As the displacing of the flood through the reservoir progresses, there are variations in the manner of handling the wells in the internal rows, such as those wells in row C in FIGURE 3, depending upon the particular type of displacement process which is being employed. If the process is miscible phase displacement, such as use of an L.P.G. slug driven by methane, when the slug reaches the stage that there is a breakthrough of L.P.G. into a well of an internal row, such as row C, the well is shut in and monitored by periodic production tests as the flood progresses to determine when the methane reaches the shut-in well. At this time, the well is converted to an injection well and methane injection is initiated into the well and continued until the entire procedure of the invention has been completed. If the displacement procedure is a water drive, the wells in the internal rows are produced until the economic limit of the ratio of water-to-liquid material has been reached, at which time the well is converted to a water injection well and maintained in that state until the completion of the entire procedure. If the displacement process employed is in-situ combustion, the producing wells in the internal rows are shut in at the time when they become so hot that there is danger of damage to the equipment positioned within the wells. This procedure is continued until all of the wells in a particular row are shut in. For example, as each well in row C becomes too hot, it is shut in until all of the wells in row C are in the shut-in state. At this time, any wells needed to maintain the desired injectivity of combustion-supporting fluid are converted to injection wells to allow the injection of sufficient combustion-supporting fluid to sustain the combustion front as it moves toward the boundaries of the field, namely, in this instance, toward the wells in row D. In other words, if any of the wells in row C are needed for the injection of sufficient combustion-supporting gases to support the combustion front so that it will move the entire distance needed, then they are converted to injection wells and maintained as such until the completion of the entire procedure of the invention.

The practice of the invention as described above provides a method of establishing a reservoir oil displacing flood front along a substantially continuous and uniform line in a reservoir and propagating that flood linearly through the reservoir to its outer boundaries, thus effecting a highly efficient recovery of the reservoir oil.

What is claimed is:
1. A process for the recovery of liquid material from a subterranean formation through a series of wells leading thereto, said wells being arranged in a geometric pattern comprising a plurality of substantially parallel rows, said process comprising the steps of:
  (a) developing liquid material displacing floods in said formation around alternate wells in an internal row of said geometric pattern;
  (b) injecting fluid into and driving the fronts of said floods from said alternate wells through said formation toward the remaining wells in said internal row until said flood fronts are sensed in said remaining wells in said internal row;
  (c) terminating injection into and shutting in said alternate wells;
  (d) developing liquid material displacing floods in said formation around said remaining wells in said internal row;
  (e) injecting fluid into and driving the fronts of said floods through said formation away from said remaining wells until said flood fronts merge with the flood fronts around said alternate wells to form a substantially uniform, continuous flood front along the entire length of said internal row;
  (f) re-establishing said alternate wells as injection wells whereby all of said wells in said internal row are injection wells;
  (g) injecting fluid into all of said wells in said internal row to drive portions of said continuous flood front away from said internal row toward the boundaries of said geometric pattern; and
  (h) recovering said liquid material from the wells other than the wells in said internal row.

2. A process for the recovery of liquid material from a subterranean formation through a series of wells leading thereto, said wells being arranged in a geometric pattern comprising a plurality of substantially parallel rows, said process comprising the steps of:
  (a) establishing as injection wells alternate wells in an internal row of said geometric pattern;
  (b) injecting fluid into said alternate wells to develop liquid material displacing floods within said formation around each of said alternate wells;
  (c) adjusting each of the remaining wells in said internal row to a predetermined state ranging from shut-in to normal production;
  (d) driving said displacing floods through said formation from said alternate wells by means of fluid injected into said alternate wells until the fronts of said floods are sensed in said remaining wells in said internal row;
  (e) terminating injection of fluid into said alternate wells;
  (f) converting said alternate wells from injection wells to shut-in wells;
  (g) converting said remaining wells in said internal row from production wells to injection wells;
  (h) injecting fluid into said remaining wells in said internal row to develop liquid material displacing floods around each of said remaining wells;
  (i) continuing fluid injection into each of said remaining wells to displace said floods around said remaining wells through said formation until said floods merge with the displacing floods propagated from said alternate wells to form a continuous flood front along the length of and encompassing said internal row;
  (j) reactivating said alternate wells in said internal row as injection wells;
  (k) injecting fluid into said alternate wells while continuing the injection of fluid into said remaining wells whereby fluid is being injected into all of the wells in said internal row to drive portions of said continuous flood outwardly along a substantially continuous front line generally parallel to said internal row toward the boundaries of said geometric pattern;
  (l) establishing all of the wells in said geometric pattern other than the wells in said internal row as production wells adjacent to permit a predetermined upper limit of production;
  (m) driving said displacing flood front to the wells in said geometric pattern other than the wells in said internal row by means of fluid injected into said wells in said internal row; and
  (n) producing each of the wells in said geometric pattern other than the wells in said internal row until each of said wells has been determined to be in a predetermined condition.

3. A process for the recovery of liquid material from a subterranean formation through a series of wells leading thereto, said wells being arranged in a geometric pattern comprising a plurality of substantially parallel rows, said process comprising the steps of:
- (a) establishing alternate wells in an internal row of said geometric pattern as injection wells;
- (b) injecting into each of said alternate wells a fluid which is miscible with said liquid material to develop a liquid material displacing flood around each of said alternate wells;
- (c) adjusting each of the remaining wells in said internal row to a state ranging between shut-in condition and limited production to facilitate control of the displacing floods established around said alternate wells;
- (d) driving said displacing floods through said formation away from said alternate wells until there is breakthrough of said miscible fluid into each of the remaining wells in said internal row which is in a producing state;
- (e) shutting in each of said alternate wells;
- (f) converting each of said remaining wells in said internal row into an injection well;
- (g) injecting into each of said remaining wells a fluid miscible with said liquid material to develop liquid material displacing floods around each of said remaining wells until a predetermined quantity of the miscible fluid has been introduced into each of said remaining wells;
- (h) driving said displacing floods around said remaining wells through said formation until said floods merge with the displacing floods around said alternate wells to form a continuous flood front along the entire length of and encompassing said internal row and said geometric pattern;
- (i) during step (h) adjusting all wells in said geometric pattern other than the wells in said internal row to a state ranging from shut-in to limited production;
- (j) when said continuous flood front is established along the line of said internal row reactivating said alternate well as injection wells;
- (k) injecting fluid into each of said alternate wells wihle continuing the injection of fluid into said remaining wells to drive said continuous flood front in portions through said formation from said internal row along substantially continuous fronts generally parallel to said internal row toward the boundaries of said geometric pattern;
- (l) when suffiicent miscible fluid has been introduced into all of the wells in said internal row to prevent dissipation of said continuous flood prior to production of the entire geometric pattern of wells, terminating the injection of said miscible fluid and initiating injection of a driving fluid into each of the wells in said internal row;
- (m) adjusting all wells in said geometric pattern other than the wells in said internal row to produce a maximum predetermined quantity of said liquid material;
- (n) when said miscible fluid is produced in any one of the wells in said geometric pattern other than the wells in said internal row, adjusting said well in other than said internal row to a shut-in state and monitoring said well until driving fluid has arrived at said well at which time said well is converted to an injection well and driving fluid is injected into said well; and
- (o) continuing the injection of driving fluid into the wells in said internal row and any other wells in said geometric pattern converted into injection wells in accordance with the previous step until the production from the wells along the boundaries of said geometric pattern is such that the ratio of driving fluid to liquid material is in excess of a predetermined minimum amount.

4. A process for the recovery of liquid material from a subterranean formation through a series of wells leading thereto, said wells being arranged in a geometric pattern comprising a plurality of substantially parallel rows, said process comprising the steps of:
- (a) establishing alternate wells in an internal row of said geometric pattern as injection wells;
- (b) injecting water into said alternate wells to develop water floods around each of said alternate wells within said formation;
- (c) establishing the remaining wells in said internal row as producing wells;
- (d) continuing the injection of water into said alternate wells to displace said water floods through said formation from said alternate wells until said water floods break through into said remaining wells in said internal row;
- (e) establishing each of the wells in said geometric pattern other than the wells in said internal row as production wells and adjusting such wells to a maximum predetermined producing rate;
- (f) when breakthrough of said water floods occurs into said remaining wells terminating the injection of water into said alternate wells and shutting in said alternate wells;
- (g) converting said remaining wells from producing wells to injection wells;
- (h) injecting water into said remaining wells to develop water floods around said remaining wells and driving said water floods through said formation from said remaining wells until said water floods merge with the water floods around said alternate wells to form a continuous water flood front along the length of said internal row and encompassing said internal row in said geometric pattern;
- (i) reactivating said alternate wells as injection wells;
- (j) injecting water into said alternate wells while continuing the injection of water into said remaining wells to drive portions of said continuous flood front through said formation along substantially uniform fronts generally parallel to said internal row toward the boundaries of said geometric pattern;
- (k) when the water-to-liquid material ratio in the production flowing from any of said wells other than the wells in said internal row exceeds a predetermined limit converting said wells from a producing well to an injection well and injecting water into said well; and
- (l) continuing the injection of water into the wells in said internal row and any wells converted to injection wells in accordance with the previous step until the water-to-liquid material ratio in all wells producing in said geometric pattern has exceeded a predetermined limit.

5. A process for the recovery of liquid material from a subterranean formation through a series of wells leading thereto, said wells being arranged in a geometric pattern comprising a plurality of substantially parallel rows, said process comprising the steps of:
- (a) establishing alternate wells in an internal row of said geometric pattern as ignition-injection wells;
- (b) injecting combustion-supporting driving fluid into each of said alternate wells and igniting said formation around each of said alternate wells to establish fire floods within said formation around each of said alternate wells;
- (c) establishing the remaining wells in said internal row as producing wells;
- (d) adjusting all other wells in said geometric pattern other than the wells in said internal row to a state ranging from shut-in condition to limited-producing condition;
- (e) injecting combustion-supporting driving fluid into each of said alternate wells to drive said fire floods outwardly through said formation from each of said alternate wells until each of said remaining wells is heated to a predetermined temperature;

(f) terminating injection of combustion-supporting driving fluid into each of said alternate wells and shutting in each of said alternate wells;

(g) converting each of said remaining wells to ignition-injection wells;

(h) igniting said formation around each of said remaining wells to establish fire floods around each of said remainnig wells;

(i) injecting combustion-supporting driving fluid into each of said remaining wells in said internal row to drive said fire floods outwardly into said formation until said fire floods merge with the fire floods around each of said alternate wells to form a continuous fire flood front along the entire length of said internal row and encompassing said internal row;

(j) reactivating each of said alternate wells in said internal row as injection wells;

(k) injecting combustion-supporting driving fluid into each of said alternate wells while continuing the injection of said combustion-supporting driving fluid into said remaining wells to drive said continuous fire flood through said formation in portions along substantially uniform fronts generally parallel to said internal row toward the boundaries of said geometric pattern;

(l) adjusting the producing rate of all wells in said geometric pattern other than the wells in said internal row to a maximum predetermined production rate;

(m) when each producing well in said geometric pattern other than the wells in said internal row has been heated to a predetermined temperature, terminating production from each such well and shutting in said well;

(n) when all producing wells in any row of said geometric pattern parallel to said internal row have ben shut in, converting as many of such wells as necessary to injection wells and injecting combustion-supporting driving fluid into said wells as needed to maintain the required amount of injectivity to support said continuous fire flood front within said formation; and (o) continuing the injection of combustion-supporting driving fluid into each of said wells in said internal row and each well into which injection is being effected in accordance with the previous step until said continuous fire flood front has reached all wells in said geometric pattern.

References Cited by the Examiner

UNITED STATES PATENTS

| | | | |
|---|---|---|---|
| 2,841,375 | 7/1958 | Salomonsson | 166—11 |
| 3,057,403 | 10/1962 | Wyllie | 166—11 X |
| 3,150,715 | 9/1964 | Dietz | 166—11 X |
| 3,153,448 | 10/1964 | Dew et al. | 166—11 X |
| 3,167,117 | 1/1965 | Santourian | 166—2 |

CHARLES E. O'CONNELL, *Primary Examiner.*

S. J. NOVOSAD, *Assistant Examiner.*